(12) United States Patent
Kurata et al.

(10) Patent No.: US 6,923,012 B2
(45) Date of Patent: Aug. 2, 2005

(54) VEHICLE AIR-CONDITIONING SYSTEM

(75) Inventors: Shun Kurata, Kariya (JP); Yoshiaki Takano, Kosai (JP)

(73) Assignee: DENSO Corporation, Kariya (JP)

( * ) Notice: Subject to any disclaimer, the term of this patent is extended or adjusted under 35 U.S.C. 154(b) by 11 days.

(21) Appl. No.: 10/761,113

(22) Filed: Jan. 20, 2004

(65) Prior Publication Data

US 2004/0148953 A1 Aug. 5, 2004

(30) Foreign Application Priority Data

Jan. 21, 2003 (JP) ........................................ 2003-012085

(51) Int. Cl.⁷ ................................................ B60H 1/32
(52) U.S. Cl. ........................... 62/159; 62/244; 165/203; 165/42
(58) Field of Search .......................... 62/159, 244, 277, 62/278; 165/42, 43, 203, 207

(56) References Cited

U.S. PATENT DOCUMENTS

| | | | | |
|---|---|---|---|---|
| 4,959,974 A | * | 10/1990 | Kusakabe | .................. 62/228.5 |
| 5,803,166 A | * | 9/1998 | Ito et al. | ..................... 165/203 |
| 5,910,157 A | * | 6/1999 | Noda | ........................... 62/133 |
| 6,230,505 B1 | * | 5/2001 | Noda et al. | .................... 62/159 |
| 6,250,093 B1 | * | 6/2001 | Fujii et al. | ................. 62/228.3 |
| 6,866,090 B2 | * | 3/2005 | Takamatsu et al. | ........... 165/41 |

FOREIGN PATENT DOCUMENTS

JP          2001-130245          5/2001

* cited by examiner

*Primary Examiner*—William E. Tapolcai
(74) *Attorney, Agent, or Firm*—Harness, Dickey & Pierce, PLC

(57) ABSTRACT

A vehicle air-conditioning system of a dual air-conditioner type exhibiting a hot gas heater function, which is designed to efficiently recover not only dormant refrigerant at the heater side, but also dormant refrigerant at the rear seat evaporator, which system sets the refrigeration cycle to a cooling mode and engages in a refrigerant recovery operation when starting up the heating mode by a hot gas heater cycle, then switches the refrigeration cycle to the heating mode, sets the front seat air-conditioning unit to the outside air mode at the time of the heating mode to blow outside air to the front seat evaporator by the front seat blower, then, when judging that the inside air temperature is high due to the refrigerant temperature of the rear seat evaporator at the time of the heating mode, operates the rear side blower to blow inside air to the rear seat evaporator.

14 Claims, 8 Drawing Sheets

VEHICLE AIR-CONDITIONING SYSTEM

BACKGROUND OF THE INVENTION

1. Field of the Invention

The present invention relates to a vehicle air-conditioning system of a dual air-conditioner type provided with cooling evaporators at both a front seat air-conditioning unit and rear seat air-conditioning unit wherein, at the time of heating, gas refrigerant delivered from the compressor (hot gas) is directly introduced to the front seat evaporator so as to provide a hot gas heater function.

2. Description of the Related Art

In the past, there has been known a vehicle air-conditioning system of the dual air-conditioner type which directly introduces a gas refrigerant delivered from a compressor (hot gas) to an evaporator at the time of heating so as to provide a hot gas heater function (see Japanese Unexamined Patent Publication (Kokai) No. 2001-130245).

In the related art, a hot gas bypass passage for directly connecting a compressor delivery side to an inlet side of a front seat evaporator bypassing the refrigerant radiator, that is, the condenser, has been provided, a heating use pressure reducing device has been provided at the hot gas bypass passage, and a cooling use solenoid valve and heating use solenoid valve have been provided for opening and closing the refrigerant passage and hot gas bypass passage to the evaporator.

In the front seat air-conditioning unit, a hot water type front seat heating use heater core is arranged at the downstream side of the front seat evaporator. Therefore, when heating at the winter, when the temperature of the hot water circulating in the heating use heater core is lower than a predetermined temperature (at the time of starting warmup of the engine), the cooling use solenoid valve is closed and the heating use solenoid valve is opened, whereby the high temperature delivery gas refrigerant (hot gas) of the compressor is made to flow into the hot gas bypass passage.

Further, by reducing the pressure of this hot gas by a heating use pressure reducing device, then directly introducing this to the front seat evaporator, the heat is radiated from the gas refrigerant to the air-conditioning air at the front seat evaporator so as to exhibit the hot gas heater function.

Further, the rear seat air-conditioning unit similarly has arranged in it a rear seat evaporator and a hot water type rear seat heating use heater core, but the hot gas bypass passage is connected to only the inlet side of the front seat evaporator and therefore the hot gas heater function is exhibited at only the front seat evaporator. This is because of the following reason.

That is, among the vehicle air-conditioning front side and rear side air-conditioning units, the front seat air-conditioning unit can be switched between introduction of inside air and outside air. At the time of heating in the winter, usually the outside air introduction mode is selected to stop fogging of the window. Therefore, by introducing low temperature outside air, the heating thermal load of the front seat air-conditioning unit is greatly increased compared with an inside air type rear seat air-conditioning unit.

Therefore, by concentrating the hot gas heater function at only the evaporator of the front seat air-conditioning unit, it is possible to effectively improve the heating performance of the front seat air-conditioning unit with its large heating thermal load by the hot gas heater function. This is due to the above.

Further, in the above related system, in the refrigeration cycle, the downstream side of the condenser has a receiver arranged in it. The inlet sides of the front seat evaporator and the rear seat evaporator have pressure reducing devices comprised of thermal type expansion valves arranged at them. Further, the outlet pipes of the front seat evaporator and rear seat evaporator are connected to a low pressure gas-liquid separator (accumulator). The outlet part of this low pressure gas-liquid separator is connected to the intake side of the compressor. Further, the outlet pipe of the rear seat evaporator has arranged at it a check valve for preventing backflow of the refrigerant from the low pressure gas-liquid separator to the rear seat evaporator side.

At the time of heating by the hot gas heater cycle, however, the refrigerant delivered from the compressor is passed through the hot gas bypass passage and directly introduced to the inlet side of the front seat evaporator, so the refrigerant delivered from the compressor flows bypassing the condenser etc. Therefore, there was the problem that the refrigerant accumulated in the condenser (dormant) could not be ejected to the hot gas heater cycle side and the amount of circulating refrigerant of the hot gas heater cycle became insufficient.

Therefore, at the time of start of heating by the hot gas heater cycle, it may be considered to set the refrigeration cycle forcibly at the cooling mode for exactly a predetermined time to pass the refrigerant delivered from the compressor through the condenser side to circulate it and recover the condenser side dormant refrigerant at the front seat evaporator side.

However, in a vehicle air-conditioning system of the dual air-conditioner type provided with cooling evaporators at both a front seat air-conditioning unit and a rear seat air-conditioning unit, if setting the system to the cooling mode at the time of startup of heating at cold times to recover the dormant refrigerant in this way, since the cooling thermal load is small, the high/low differential pressure of the cycle becomes extremely small and the amount of circulating refrigerant is small. In addition to this, the rear seat evaporator is arranged at a position far away from the compressor compared with the front seat evaporator, so the pressure loss of the refrigerant passage of the rear seat evaporator is large. As a result, even if setting the system to the cooling mode to recover the dormant refrigerant at the time of startup of heating, it is difficult to recover the refrigerant dormant at the rear seat evaporator. Conversely, along with setting the cooling mode, sometimes the refrigerant flowing into the rear seat evaporator ends up becoming newly dormant at the rear seat evaporator.

SUMMARY OF THE INVENTION

An object of the present invention is to provide a vehicle air-conditioning system of a dual air-conditioner type exhibiting a hot gas heater function which efficiently recovers not only dormant refrigerant at the radiator (condenser) side, but also dormant refrigerant at the rear seat evaporator.

To attain the above object, there is provided a vehicle air-conditioning system of a dual air-conditioner type exhibiting a hot gas heater function, which sets the refrigeration cycle to a cooling mode and performs a refrigerant recovery operation when starting up the heating mode by a hot gas heater cycle (S30), then switches the refrigeration cycle to the heating mode (S50), sets the front seat air-conditioning unit to the outside air mode at the time of the heating mode to blow outside air to the front seat evaporator by the front seat blower, then judges if the inside air temperature is high due to the refrigerant temperature of the rear seat evaporator at the time of the heating mode and, if so, operates the rear side blower to blow inside air to the rear seat evaporator.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
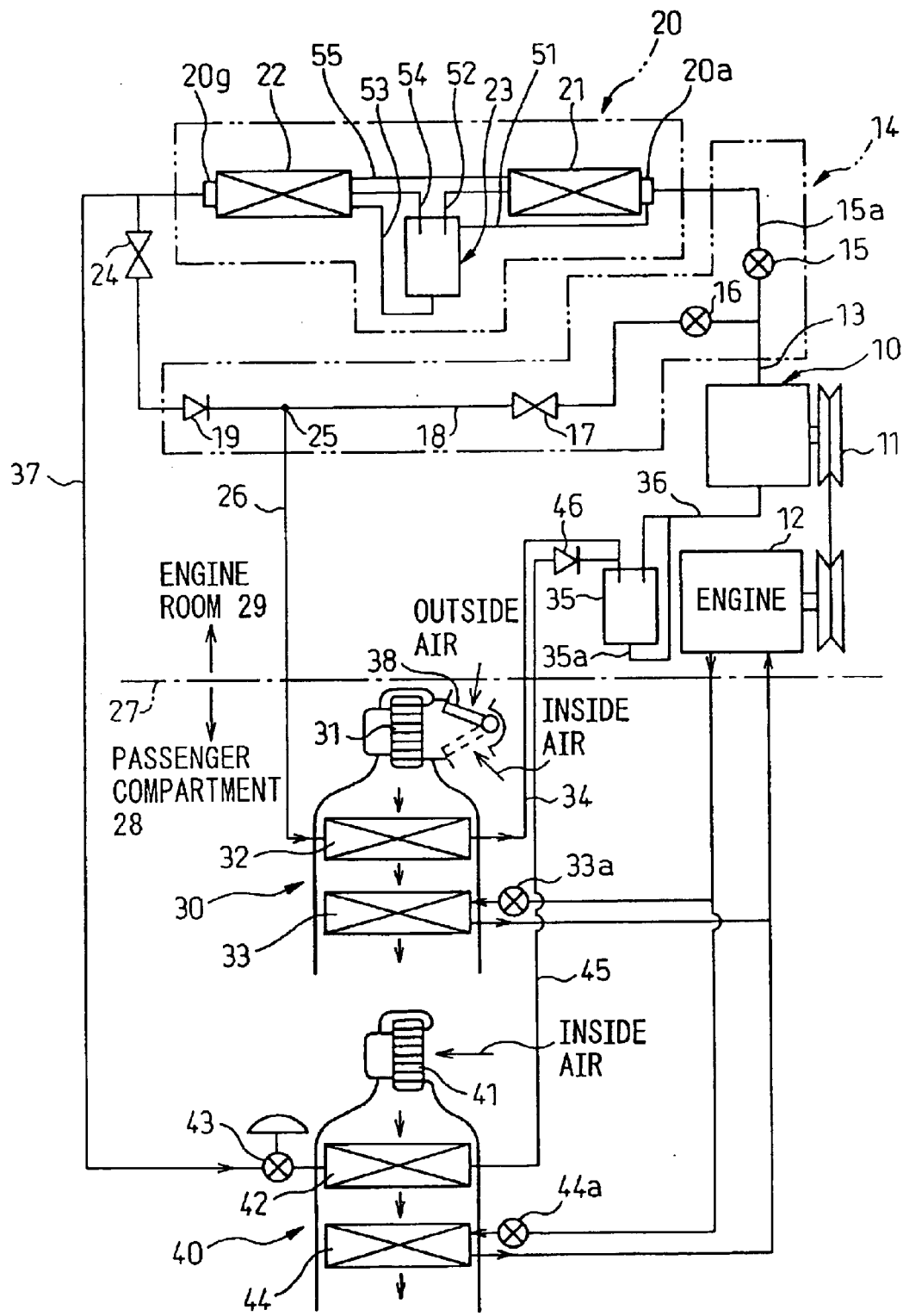
FIG. 1 is a circuit diagram of a refrigeration cycle and hot water circuit in a system according to a first embodiment of the present invention.

The different aspects of the invention will be summarized first. The reference numerals in parentheses after the means indicated show the correspondence with specific means described in the embodiments.

According to a first aspect of the invention, there is provided a vehicle air-conditioning system of a dual air-conditioner type provided with a front seat air-conditioning unit (30) for air-conditioning a front seat area in a passenger compartment and a rear seat air-conditioning unit (40) for air-conditioning a rear seat area in the passenger compartment; the front seat air-conditioning unit (30) has arranged in it an inside/outside air switching means (38) for switching between introduction of inside air and outside air, a front seat blower (31) for blowing air introduced by the inside/outside air switching means (38) toward the front seat area in the passenger compartment, and a front seat evaporator (32) for absorbing heat from the air blown by the front seat blower (31) for evaporation of low pressure refrigerant of a refrigeration cycle; the rear seat air-conditioning unit (40) has arranged in it a rear seat blower (41) for sucking in inside air and blowing it toward the rear seat area in the passenger compartment and a rear seat evaporator (42) for absorbing heat from the air blown by the rear seat blower (41) for evaporation of low pressure refrigerant of the refrigeration cycle; the refrigeration cycle is provided with a hot gas bypass passage (18) for reducing the pressure of the gas refrigerant delivered from the compressor (10), then introducing it into the front seat evaporator (32); at the time of the cooling mode, the hot gas bypass passage (18) is set to a closed state, the refrigerant passage at a radiator (20) side of the refrigeration cycle is set to an open state, the gas refrigerant delivered from the compressor (10) is introduced to the radiator (20), the refrigerant passed through the radiator (20) is reduced in pressure by the front seat pressure reducing means (24) and rear seat pressure reducing means (43), the low pressure refrigerant passed through the front seat pressure reducing means (24) is made to evaporate by the front side evaporator (32), and the low pressure refrigerant passed through the rear seat pressure reducing means (43) is made to evaporate by the rear seat evaporator (42); at the time of the heating mode, the hot gas bypass passage (18) is set to an open state, the refrigerant passage at the radiator (20) side is closed, and the gas refrigerant delivered from the compressor (10) is directly introduced to the front side evaporator (32) by the hot gas bypass passage (18) to exhibit a hot gas heater function by the front seat evaporator (32); and at the heating mode, the inside/outside air switching means (38) is used to set an outside air mode, the front seat blower (31) is used to blow outside air to the front seat evaporator (32), and, when judging conditions by which the refrigerant of the rear seat evaporator (42) can absorb heat from the inside air at the heating mode exist, the rear seat blower (41) is operated to blow inside air to the rear seat evaporator (42). Further, at the time of startup of the heating mode, the refrigeration cycle is set to the cooling mode, a refrigerant recovery operation is performed, and the refrigeration cycle is switched to the heating mode after the refrigerant recovery operation is performed.

According to this, it is possible to set the refrigeration cycle to the cooling mode and perform a refrigerant cooling operation when starting up the heating mode, then apply the pressure of the gas refrigerant delivered from the compressor (10) to the radiator (20) so as to recover the dormant refrigerant at the radiator (20).

However, in the refrigeration cycle, since the rear seat evaporator (42) has a much longer circulation pipe connecting with the compressor (10) than the front seat evaporator (32), the pipe pressure loss is large and the amount of circulating refrigerant is small. Therefore, at the time of the above refrigerant recovery operation, recovery of the dormant refrigerant at the rear seat evaporator (42) is difficult.

However, according to the first aspect, at the time of the heating mode, the front seat air-conditioning unit (30) sets the outside air mode and blows outside air from the front seat blower (31) to the front seat evaporator (32), while the rear seat air-conditioning unit (40), when judging the conditions by which the refrigerant of the rear seat evaporator (42) can absorb heat from the inside air exist, operates the rear seat blower (41) to blow inside air to the rear seat evaporator (42), so at the time of the heating mode, the refrigerant of the rear seat evaporator (42) can absorb heat from the inside air sufficiently higher in temperature compared with the outside air. Therefore, it is possible to create a refrigerant pressure relationship where the refrigerant pressure of the rear seat evaporator (42) is higher than the refrigerant pressure of the front seat evaporator (32).

As a result, in the heating mode, it is possible to make the refrigerant flow from the rear seat evaporator (42) to the outlet side of the front seat evaporator (32), so the dormant refrigerant of the rear seat evaporator (42) can also be recovered. Note that at the time of the heating mode, it is possible to set the outside mode by the front seat air-conditioning unit (30) and introduce low humidity outside air compared with the inside air so as to prevent fogging of the vehicle window glass.

According to a second aspect of the invention, there is provided the vehicle air-conditioning system as set forth in the first aspect wherein at the heating mode, the rear seat blower (41) is made to operate at its minimum volume state.

However, if blowing the inside air to the rear seat evaporator (42) at the time of the heating mode, the inside air has its heat absorbed by the rear seat evaporator (42) and drops in temperature. Therefore, at the time of the heating mode, if the volume of the rear seat blower (41) is increased, low temperature air is liable to be blown out to the rear seat side in the passenger compartment and cause the heating feeling of the rear seat side in the passenger compartment to deteriorate, but according to the second aspect of the invention, the rear seat blower (41) is actuated in the minimum volume state so as to suppress any deterioration of the heating feeling.

According to a third aspect of the invention, there is provided a vehicle air-conditioning system as set forth in the first or second aspect, wherein the system is further provided with an inside air temperature detecting means (62) for detecting an inside air temperature and a refrigerant temperature information detecting means (68) for detecting information relating to the refrigerant temperature of the rear seat evaporator (42), and the conditions by which the refrigerant of the rear seat evaporator (42) can absorb heat from the inside air are judged to exist based on the inside air temperature and the refrigerant temperature.

According to a fourth aspect of the invention, there is provided a vehicle air-conditioning system as set forth in the third aspect wherein the refrigerant temperature information detecting means is comprised of a refrigerant pressure detecting means (68) for detecting a refrigerant pressure of the rear seat evaporator (42).

According to a fifth aspect of the invention, there is provided a vehicle air-conditioning system as set forth in the first or second aspect wherein the conditions by which the refrigerant of the rear seat evaporator (42) can absorb heat from the inside air are judged to exist based on the elapsed time after startup of the heating mode.

That is, since the temperature of the inside air gradually rises due to the execution of the heating mode by the hot gas heater cycle, it is possible to judge that the conditions by which the refrigerant of the rear seat evaporator (42) can absorb heat exist by the elapsed time after the startup of the heating mode.

According to a sixth aspect of the invention, there is provided a vehicle air-conditioning system as set forth in any one of the first to fifth aspects wherein, when performing the refrigerant recovery operation, the inside/outside air switching means (38) sets the outside air mode to blow outside air from the front seat blower (31) to the front seat evaporator (32) and the rear seat blower (41) is operated to blow inside air to the rear seat evaporator (42).

At the time of heating in the winter, however, the temperature of the inside air is higher than the outside air, so when setting the refrigeration cycle to the cooling mode and performing the refrigerant recovery operation, it is possible to create a refrigerant-pressure relationship of the refrigerant pressure of the rear seat evaporator (42) being higher than the refrigerant pressure of the front seat evaporator (32). As a result, at the time of the refrigerant recovery operation, it is possible to make the refrigerant flow from the rear seat evaporator (42) to the outlet side of the front seat evaporator (32) and recover the dormant refrigerant of the rear seat evaporator (42).

A vehicle air-conditioning system as set forth in any one of first to sixth aspects, wherein a rear seat high pressure pipe (37) connected to the upstream side of the rear seat pressure reducing means (43) arranged at an inlet of the rear seat evaporator (42) has arranged in it a check valve (46a) for preventing the inflow of refrigerant from the rear seat evaporator (42) to the radiator (20) side.

Due to this, at the time of the heating mode, it is possible to prevent the refrigerant from flowing from the rear seat evaporator (42) to the radiator (20) side by a check valve (46a). Further, the check valve (46a) is arranged at the rear seat high pressure pipe (37) of a pipe size smaller than the low pressure pipe, so the check valve (46a) can be made smaller than the check valve arranged at the low pressure pipe.

Preferred embodiments of the present invention will be described in detail below while referring to the attached figures.

First Embodiment

Figure 2:
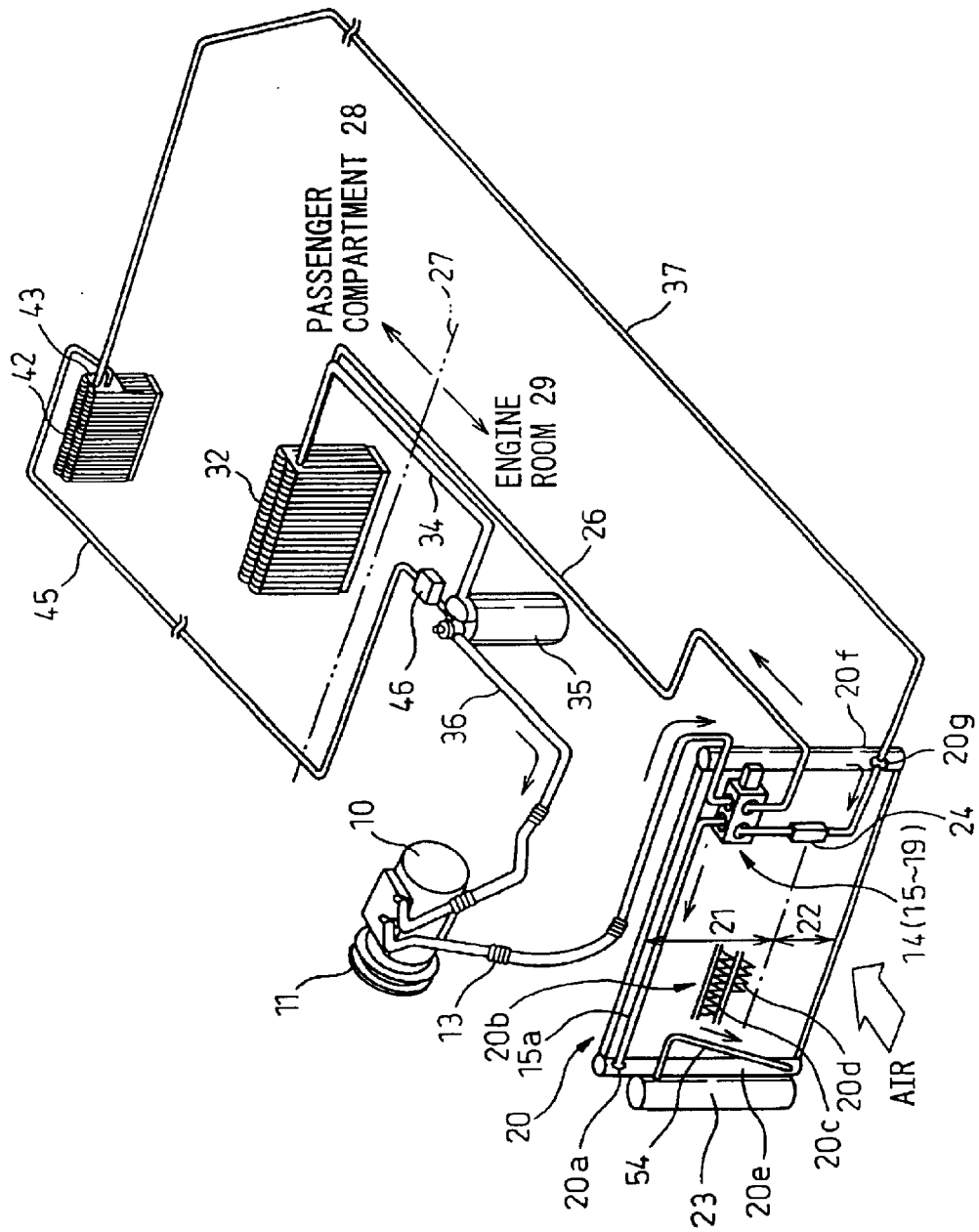
FIG. 2 is a view of the mounting of the refrigeration cycle parts in a vehicle according to the first embodiment.

FIG. 1 illustrates the circuit configuration of the refrigeration cycle and the hot water circuit configuration of the vehicle air-conditioning system according to a first embodiment, while FIG. 2 illustrates the layout of the refrigeration cycle parts of the vehicle air-conditioning system according to the first embodiment mounted in a vehicle.

The first embodiment relates to a vehicle air-conditioning system of a dual air-conditioner system provided with both a front seat air-conditioning unit 30 for air-conditioning a front seat area of a passenger compartment 28 and a rear seat air-conditioning unit 40 for air-conditioning a rear seat area of the passenger compartment 28. The air-conditioning system is applied for example to a one-box type recreational vehicle or another vehicle having a large compartment space.

Note that the front seat air-conditioning unit 30 is mounted at the inside of an instrument panel (not shown) arranged at the front of the passenger compartment 28, while the rear seat air-conditioning unit 40 is mounted near either the left or right side wall of the vehicle body side walls of the rear seat side of the passenger compartment.

In the refrigeration cycle of the vehicle air-conditioning system, the compressor 10 is driven by a vehicle engine 12 through an electromagnetic clutch 11. The delivery pipe 13 of the compressor 10 is provided with a valve device 14. This valve device 14, as shown in FIG. 1, is provided with a cooling solenoid valve 15 serving as a first valve means, a heating solenoid valve 16 serving as a second valve means, a heat pressure reducing device 17, a hot gas bypass passage 18, and a check valve 19. These parts 15 to 19 are combined into a single assembly (14) as shown in FIG. 2.

Here, the heating solenoid valve 16 and the heating pressure reducing device 17 are set in the hot gas bypass passage 18. The heating pressure reducing device 17 can be configured by a small diameter constriction hole (fixed constriction) formed at the outlet of the heating solenoid valve 16.

The delivery pipe 13 of the compressor 10 is connected through the cooling solenoid valve 15 and outlet pipe 15a of the valve device 14 to an inlet joint 20a of the condenser 20. Here, the condenser 20 is a refrigerant radiator. Normally, it is arranged at the frontmost part of the vehicle engine room. By blowing outside air to a heat exchanger 20b of the condenser 20 (FIG. 2) by a not shown electric cooling fan, the high pressure gas refrigerant delivered from the compressor 10 is heat exchanged with the outside air, cooled, and condensed.

The heat exchanger 20b of the condenser 20, as shown in FIG. 2, is comprised of flat tubes 20 through which the refrigerant flows arranged in the horizontal direction. These tubes 20c are alternately stacked in the vertical direction with corrugated fins 20d. At the two ends of the tubes 20c (two ends in horizontal direction) are provided header tanks 20e and 20f so as to extend in the vertical direction. The two ends of the tubes 20c are communicated with the spaces inside the header tanks 20e and 20f.

The heat exchanger 20b of the condenser 20 is provided with a first heat exchanger 21 and second heat exchanger 22 in sequence in the refrigerant flow direction. Further, the first heat exchanger 21 and second heat exchanger 22 are provided between them with a high pressure side gas-liquid separator 23 for separating the refrigerant into a gas and liquid and accumulating the liquid refrigerant. The high pressure gas-liquid separator 23 utilizes the differential density of the liquid refrigerant and gas refrigerant in the inside space extending in the vertical direction to separate the refrigerant into a gas and liquid and stores the liquid refrigerant at the bottom part of the inside space of the tank.

Part of the gas refrigerant delivered from the compressor of the inlet joint 20a is branched off by the first bypass passage 51 and directly introduced into the gas-liquid separator 23, while part of the refrigerant condensed at the first heat exchanger 21 is branched off by the second bypass passage 52 and directly introduced into the gas-liquid separator 23. Due to this, the amount of the liquid refrigerant accumulated in the gas-liquid separator 23 is adjusted to an amount in accordance with the degree of overheating of the gas refrigerant delivered from the compressor.

The main flow of the refrigerant condensed at the first heat exchanger 21 passes through the constriction passage 55 inside of the header tank 20e and flows to the inlet side of the second heat exchanger 22. Further, the liquid refrigerant near the bottom part of the gas-liquid separator 23 passes through a liquid return communicating path 53 inside of the header tank 20e and flows to the inlet side of the second heat exchanger 22. Further, the gas refrigerant at the top of the inside of the gas-liquid separator 23 passes through the gas return communicating path 54 and flows to the inlet side of the second heat exchanger 22. The outlet side of the second heat exchanger 22 is communicated via the bottom space of the other heater tank 20f with the outlet joint 20g.

The outlet joint 20g has a front seat cooling pressure reducing device 24 and a high pressure liquid pipe 37 to the rear seat connected to it. The front seat cooling pressure reducing device 24 is for reducing the pressure of the high pressure liquid refrigerant passed through the condenser 20 to a low pressure two-phase gas-liquid state. This device 24 is comprised of a fixed constriction. In the present example, as a fixed constriction, specifically use is made of a small diameter (for example about φ1.2 to 1.3 mm) cut to a predetermined length to form a capillary tube generating a pressure loss.

The outlet side of the front seat cooling pressure reducing device 24 has a check valve 19 in the valve device 14 (FIG. 1) connected to it. This check valve 19 is for preventing the backflow of the refrigerant from the hot gas bypass passage 18 to the condenser 20 side at the time of the heating mode. The outlet of the check valve 19 merges with the outlet of the hot gas bypass passage 18 at the inside of the valve device 14.

Therefore, the hot gas bypass passage 18 can be configured by an extremely short passage built into the valve device 14 positioned at a location near the condenser 20. The merging part 25 of the outlet of the hot gas bypass passage 18 and the check valve 19 can also be built into the valve device 14.

Further, this merging part 25 is connected to a single inlet low pressure pipe 26. This single low pressure pipe 26 passes through a hole in the dashboard 27 to the inside of the passenger compartment 28. Here, the dashboard 27 partitions the engine room 29 of the vehicle from the passenger compartment 28.

The front seat air-conditioning unit 30 arranged at the inner side of the instrument panel (not shown) of the front part of the passenger compartment 28 is provided with a front seat electric blower 31. The suction side of the front seat electric blower 31 has an inside/outside air switching door 38 forming the inside/outside air switching means arranged rotably at it. This inside/outside switching door 38 switches between an outside air mode for introducing outside air (air from outside the passenger compartment) and an inside air mode for introducing inside air (air inside the passenger compartment).

Further, the downstream side of the front seat electric blower 31 has a front seat evaporator 32 arranged at it. The refrigerant inlet of the front seat evaporator 32 is connected to the above low pressure pipe 26. The downstream side of the air of the front seat evaporator 32 has a front seat heating use heater core 33 arranged at it.

On the other hand, the rear seat air-conditioning unit 40 arranged at the rear area of the passenger compartment 28 is configured similar to the front seat air-conditioning unit 30 and provided with a rear seat electric blower 41. The suction side of the rear seat electric blower 41 opens to the inside of the passenger compartment 28 and continuously sucks in inside air.

The downstream side of the rear seat electric blower 41 has a rear seat evaporator 42 arranged at it. The refrigerant inlet of the rear seat evaporator 42 is connected to a temperature-type expansion valve 43 as a rear seat pressure reducing device. The inlet side of the temperature-type expansion valve 43 is connected to the above rear seat high pressure liquid pipe 37.

The rear seat temperature-type expansion valve 43, as well known, senses the degree of overheating of the outlet refrigerant of the rear seat evaporator 42 and adjusts the valve opening degree (flow of refrigerant) so that the degree of overheating of the outlet refrigerant becomes a predetermined value (for example, about 3° C. to 15° C.). The downstream side of the air of the rear seat evaporator 42 has a rear seat heating use heater core 44 arranged at it.

The refrigerant outlets of the front seat evaporator 32 and the rear seat evaporator 42 are connected to outlet side low pressure pipes 34 and 45. The outlet side low pressure pipes 34 and 45 pass through the dashboard 27 and are laid to the engine compartment 29 side and are further connected to the inlet of the low pressure gas-liquid separator 35 in the engine compartment 29. A position near the outlet end of the rear seat outlet side low pressure pipe 45 is connected to a check valve 46. This check valve 46 is for preventing the refrigerant from flowing back from the low pressure gas-liquid separator 35 to the rear seat evaporator 42 at the time of the heating mode.

The outlet of the low pressure gas-liquid separator 35 passes through the suction pipe 36 and is connected to the suction port of the compressor 10. The low pressure gas-liquid separator 35 separates the refrigerant flowing from the outlet side low pressure pipe 34 of the front seat evaporator 32 into a gas and liquid, accumulates the liquid refrigerant, and guides the gas refrigerant to be sucked into the compressor 10.

Further, a liquid return constriction passage 35a for making part of the liquid refrigerant near the bottom of the inside of the low pressure gas-liquid separator 35 be sucked into the compressor 10 is provided at the low pressure gas-liquid separator 35. This liquid return constriction passage 35a is for returning the lubricating oil included in the liquid refrigerant to the compressor 10 in the same way as the liquid return passage 53 in the condenser 20.

The low pressure gas-liquid separator 35 is used in combination with the high pressure gas-liquid separator 23 of the condenser 20 explained above and has a gas-liquid separation action and liquid refrigerant accumulation action only at the time of the heating mode. At the time of the cooling mode, the high pressure gas-liquid separator 23 of the condenser 20 has a gas-liquid separator and liquid refrigerant accumulation action. The overheated gas refrigerant from the outlets of the front and rear evaporators 32 and 42 of the vehicle flows into the low pressure gas-liquid separator 35, so the low pressure gas-liquid separator 35 serves as a simple passage for the overheated gas refrigerant.

In the front seat air-conditioning unit 30, the front seat evaporator 32 cools the air blown from the air-conditioning blower 31 (inside air or outside air in the passenger compartment) in the cooling mode (or when dehumidification is necessary) by the absorption of heat by the latent heat of evaporation of the low pressure refrigerant. Further, at the time of heating in the winter, the front seat evaporator 32 carries the high temperature refrigerant gas (hot gas) from the hot gas bypass passage 18 to heat the air, so functions as a radiator.

As opposed to this, the rear seat evaporator 42 in the rear seat air-conditioning unit 40 only has a cooling action for cooling the blown air at the time of the cooling mode. It does not function as a radiator.

Further, the front seat heating use heater core 33 and the rear seat heating use heater core 44 are connected to the hot water circuit of the vehicle engine 12 through a front seat hot water valve 33a and a rear seat hot water valve 44a. Further, the hot water (cooling water) of the vehicle engine 12 is circulated by an engine-driven hot water pump (not shown) through the front seat hot water valve 33a and rear seat hot water valve 44a to the heater cores 33 and 44. Due to this, the heater cores 33 and 44 heat the air after passing through the evaporators using the hot water as a heat source.

Further, at the front seat air-conditioning unit 30, air-conditioning air is blown from the front seat blowing port (not shown) provided at the downstream side of the front seat heating use heater core 33 to the front seat side of the passenger compartment 28. Similarly, at the rear seat air-conditioning unit 40 as well, air-conditioning air is blown from the rear seat blowing port (not shown) provided at the downstream side of the rear seat heating use heater core 44 to the rear seat side of the passenger compartment 28.

Figure 3:
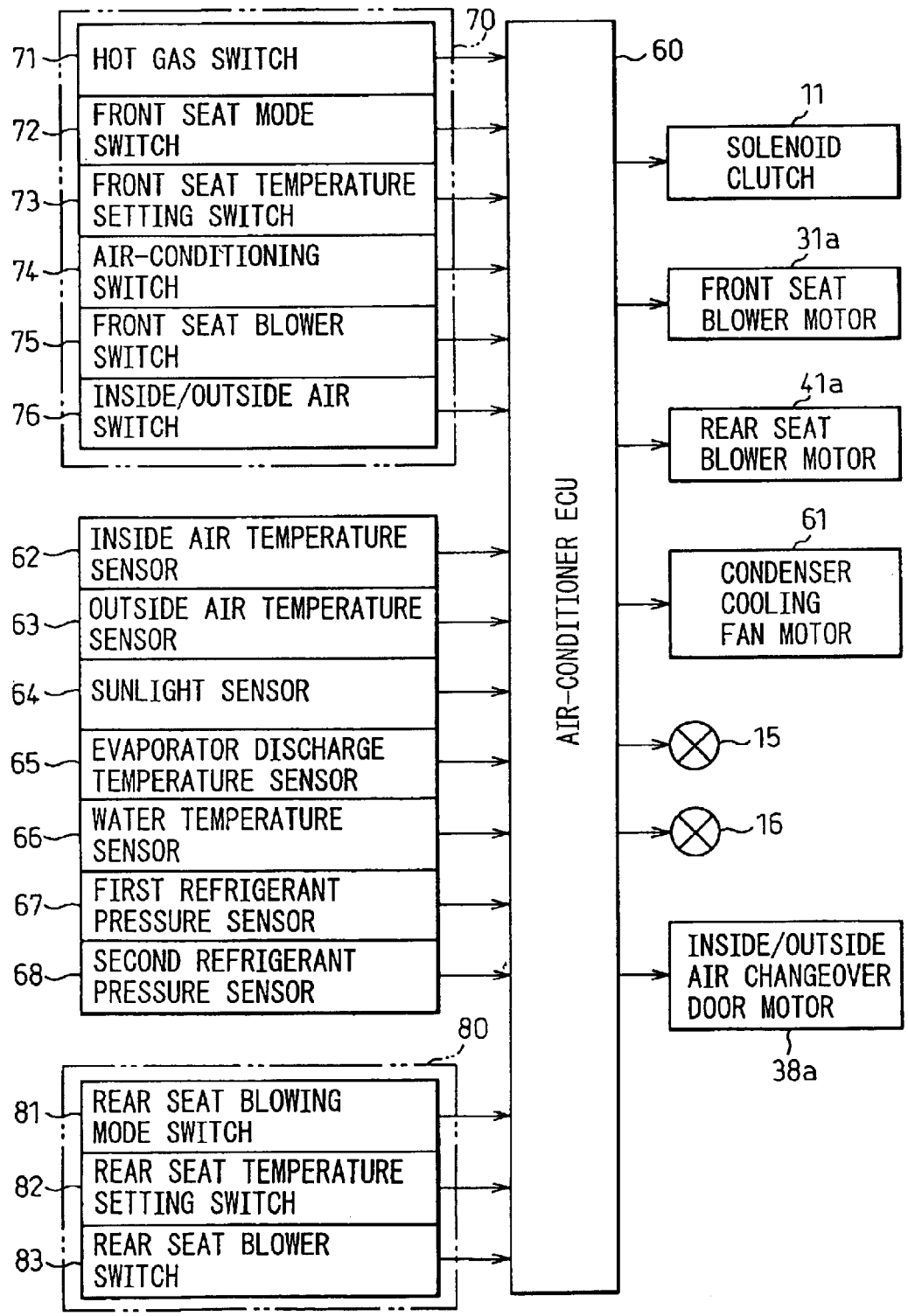
FIG. 3 is a block diagram of an electrical controller according to the first embodiment.

Next, FIG. 3 is a schematic block diagram of an electrical controller in the first embodiment. The air-conditioning controller (hereinafter referred to as the "ECU") is comprised of a microcomputer and its peripheral circuits and performs predetermined processing in accordance with a preset program to control the operation of the air-conditioner parts.

Specifically, the electromagnetic clutch 11, the cooling use solenoid valve 15, the heating use solenoid valve 16, a motor 31a of the front seat electric blower 31, a motor 41a of the rear seat electric blower 41, a drive motor 38a of the inside/outside switching door 38, a motor 61 of the condenser electric cooling fan, and other air-conditioner parts are controlled in operation by the ECU 60.

The ECU 60 receives as input detection signals from a group of sensors including an inside/outside temperature sensor 62 for detecting the temperature inside the passenger compartment (inside air temperature), an outside air temperature sensor 63 for detecting an outside air temperature, a sunlight sensor 64 for detecting the amount of sunlight striking the passenger compartment, a blown air temperature sensor 65 of the front seat evaporator 32, a water temperature sensor 66 for detecting the water temperature of the vehicle engine 12, a first refrigerant pressure sensor 67 for detecting the delivered refrigerant pressure of the compressor 10 (high pressure refrigerant pressure), a second refrigerant pressure sensor 68 for detecting the refrigerant pressure of the rear seat evaporator 42, etc.

Note that the second refrigerant pressure sensor 68 is for detecting the refrigerant temperature of the rear seat evaporator 42. That is, the inside of the rear seat evaporator 42 is normally in a two-phase state (saturated state) including a liquid state refrigerant, so the refrigerant temperature can be found unambiguously based on the refrigerant pressure. Therefore, by detecting the refrigerant pressure of the rear seat evaporator 42 by the second refrigerant pressure sensor 68, the refrigerant temperature of the rear seat evaporator 42 can be found based on the detected pressure.

Here, the reason why a refrigerant temperature sensor for detecting the refrigerant temperature of the rear seat evaporator 42 is not used, but a refrigerant pressure sensor 68 is used is that a refrigerant pressure sensor can be easily acquired from the market.

Further, the front seat air-conditioning operation panel 70 is set near the instrument panel of the passenger compartment. Operation signals of the following operation switches are input from the front seat air-conditioning operation panel 70 to the ECU 60. That is, the hot gas switch 71 sets the heating mode by the hot gas heater cycle, so performs the function of a heating switch. The front seat blowing mode switch 72 switches the blowing mode of the front seat air-conditioning unit 30. The front seat temperature setting switch 73 serves as a front seat temperature setting means for setting the temperature at the front seat side of the passenger compartment to a desired temperature.

Further, the air-conditioner switch 74 instructs the startup or turn off of the compressor 10 of the refrigeration cycle and performs the function of a cooling switch for setting the cooling mode. Further, the front seat blower switch 75 turns the front seat blower 31 on and off and instructs switching of its air volume. The inside/outside air switch 76 instructs switching between the outside air mode and the inside air mode.

The rear seat air-conditioning operation panel 80 is set at the rear seat side of the passenger compartment. The rear seat air-conditioning operation panel 80 is provided with a rear seat blowing mode switch 81 for switching the blowing mode of the rear seat air-conditioning unit 40, a rear seat temperature setting switch 82 for setting the temperature of the rear seat side of the passenger compartment to a desired temperature, and a rear seat blower switch 83 for turning on and off the rear seat blower 41 and instructing switching of the air volume. The operation signals of these rear seat switches are input to the ECU 60.

Next, the operation of the first embodiment in the above configuration will be explained. When the air conditioner switch 74 of the front seat air-conditioning operation panel 70 is turned on and the cooling mode is selected, the cooling use solenoid valve 15 is opened and the heating use solenoid valve 16 is closed by the ECU 60. Further, the electromagnetic clutch 11 is energized to become connected, whereby the compressor 10 is driven by the vehicle engine 12.

In the cooling mode, when simultaneously operating the front seat air-conditioning unit 30 and the rear seat air-conditioning unit 40, the front seat electric blower 31 and the rear seat electric blower 41 are both operated to blow air into the front and rear air-conditioning units 30 and 40.

If the compressor 10 operates, the delivery gas refrigerant of the compressor 10 passes through the opened cooling solenoid valve 15, whereby the refrigerant circulates through the closed circuit of the condenser 20→front seat cooling pressure reducing device 24 comprised of the fixed constriction→check valve 19→front seat evaporator 32→low pressure gas-liquid separator 35→compressor 10.

At the same time as this, part of the high pressure liquid refrigerant at the outlet side of the condenser 20 is branched off to the rear seat high pressure liquid pipe 37 to pass through the temperature type expansion valve 43 forming the rear seat cooling pressure reducing device→rear seat evaporator 42→low pressure gas-liquid separator 35, then the refrigerant is sucked into the compressor 10.

Therefore, the low pressure refrigerant reduced in pressure by the front seat cooling pressure reducing device 24 evaporates at the front seat evaporator 32 and cools the air blown by the front seat electric blower 31. At the same time as this, the low pressure refrigerant reduced in pressure by the rear seat temperature-type expansion valve 43 evaporates at the rear seat evaporator 42 and cools the air blown by the rear seat electric blower 41. Due to this, the cool air cooled by the front and rear evaporators 32 and 42 can be blown out to the front seat side and rear seat side of the passenger compartment 28 and cool the inside of the passenger compartment 28.

However, since the rear seat cooling pressure reducing device is comprised by a temperature-type expansion valve 43, the temperature-type expansion valve 43 adjusts the flow of refrigerant to the rear seat evaporator 42 so that the outlet refrigerant of the rear seat evaporator 42 is maintained at a predetermined degree of overheating (for example, 10° C.).

As opposed to this, the front seat cooling pressure reducing device 24 is comprised by a fixed constriction and the outlet side of the front seat evaporator 32 is provided with a low pressure gas-liquid separator 35, but due to the above reasons, the flow of the refrigerant circulating in the cycle is adjusted so that the outlet refrigerant of the front seat evaporator 32 also has a predetermined degree of overheating.

That is, in the condenser 20, part of the delivery gas refrigerant from the inlet joint 20a flows directly from the first bypass passage 51 to the inside of the high pressure gas-liquid separator 23, while part of the liquid refrigerant condensed at the first heat exchanger 21 flows directly from the second bypass passage 52 to the inside of the high pressure gas-liquid separator 23. The delivered gas refrigerant and condensed liquid refrigerant are mixed inside the high pressure gas-liquid separator 23 and exchange heat. Therefore, in this case, the refrigerant becomes a two-phase gas-liquid state having a dryness in accordance with the degree of overheating of the gas refrigerant delivered from the compressor.

As a result, the amount of the liquid refrigerant accumulated in the high pressure gas-liquid separator 23 becomes an amount corresponding to the degree of overheating of the gas refrigerant delivered from the compressor. In other words, it is possible to adjust the amount of liquid refrigerant accumulated in the high pressure gas-liquid separator 23 in response to a change in the degree of overheating of the gas refrigerant delivered from the compressor. By adjusting the amount of the liquid refrigerant, it is possible to adjust the flow of the refrigerant circulating in the cycle and adjust the degree of overheating of the gas refrigerant delivered from the compressor. Further, the compression process at the compressor 10 is basically an isentropic change, so if it were possible to control the degree of overheating of the gas refrigerant delivered by the compressor 10, it would become possible to indirectly control the degree of overheating of the suction refrigerant of the compressor 10, that is, the degree of overheating of the outlet refrigerant of the front seat evaporator 32.

Note that even if the suction side of the compressor 10 is provided with a low pressure gas-liquid separator 35, at the time of the cooling mode, this low pressure gas-liquid separator 35 carries the overheated gas refrigerant having a predetermined amount of overheating from the outlet of the surrounding evaporators 32 and 42, so the low pressure gas-liquid separator 35 forms a simple passage of the overheated gas refrigerant and does not exhibit a liquid refrigerant accumulating action.

Note that in the cooling mode, when the passenger is not sitting at the rear seats in the passenger compartment, the operation of the rear seat air-conditioning unit 40 is stopped and the front seat air-conditioning unit 30 is operated alone. At the time of sole operation, only the front seat electric blower 31 is operated and the rear seat electric blower 41 is stopped. Due to this, there is almost no further evaporation of the refrigerant at the rear seat evaporator 42 and the rear seat temperature type expansion valve 43 is kept in the substantially closed state due to the built-in spring, so the flow of the refrigerant to the rear seat evaporator 42 is substantially cut off and the front seat operation alone is performed.

Next, when the hot gas switch 71 of the front seat air-conditioning operation panel 70 is turned on and the heating mode is selected, the cooling solenoid valve 15 is closed by the ECU 60, the heating solenoid valve 16 is closed, and the hot gas bypass passage 18 is opened. Therefore, the high temperature delivery gas refrigerant (overheated gas refrigerant) of the compressor 10 passes through the opened heating solenoid valve 16, then is reduced in pressure by the heating pressure reducing device (fixed constriction) 17.

The reduced pressure gas refrigerant passes through the hot gas bypass passage 18 and the low pressure pipe 26 and is introduced into the front seat evaporator 32 of the front seat air-conditioning unit 30 in the passenger compartment. Therefore, heat is discharged from the front seat evaporator 32 to the air blown by the front seat electric blower 31 and the blown air is heated.

The blown air heated by the front seat evaporator 32 is further heated using hot water as a heat source at the front seat heating use heater core 33 positioned at the downstream side of the front seat evaporator 32 and becomes further higher in temperature. This high temperature air is blown out from the front seat blowing port (not shown) provided at the downstream side of the front seat heating use heater core 33 to the feet of the front seat passenger in the passenger compartment 28. Therefore, the heating function by the hot gas heater can exhibit an auxiliary heating function for the main heating function of the front seat heating use heater core 33 using the hot water heat source.

Further, the gas refrigerant discharging heat at the front seat evaporator 32 flows into the low pressure gas-liquid separator 35. At this low pressure gas-liquid separator 35, the gas refrigerant and the liquid refrigerant are separated by the differential densities. The gas refrigerant is sucked into the compressor 10 and again compressed. Simultaneously, a certain amount of the liquid refrigerant accumulated at the bottom side of the low pressure gas-liquid separator 35 and containing lubricating oil is sucked into the compressor 10 from the oil return passage 35a.

Note that the time of the heating mode, the check valve 19 suppresses the gas refrigerant from flowing back from the hot gas bypass passage 18 to the condenser 20 side and accumulating in the condenser 20 (dormancy phenomenon). Similarly, the check valve 46 suppresses the outlet refrigerant of the front seat evaporator 32 from flowing back to the rear seat evaporator 42 side and accumulating in the rear seat evaporator 42 (dormancy phenomenon).

Note that in the front seat air-conditioning unit 30, introduction of the inside air and the outside air can be switched. At the time of heating in the winter, however, to prevent fogging of the window, the outside air introduction mode is selected. Therefore, by introducing the low temperature outside air, the heating thermal load of the front seat air-conditioning unit 30 becomes much greater than the inside air introduction type rear seat air-conditioning unit 40.

Therefore, by concentrating the hot gas function at only the front seat evaporator 32 of the front seat air-conditioning unit 30, it is possible to effectively improve the heating performance of the front seat air-conditioning unit with the larger heating thermal load.

Note that in the rear seat air-conditioning unit 40, only the inside air is introduced, hot water is used as a heat source to heat the inside air at the rear seat heating use heater core 44, and the high temperature inside air is blown out from the rear seat discharge port (not shown) provided at the downstream side of the rear seat heating use heater core 44 toward the feet of the rear seat passenger in the passenger compartment 28.

The above explanation relates to the basic operation of the cooling mode and heating mode. In practice, however, at the time of startup of the heating mode, a refrigerant recovery operation is performed to recover the dormant refrigerant at the condenser 20 side.

Figure 4:
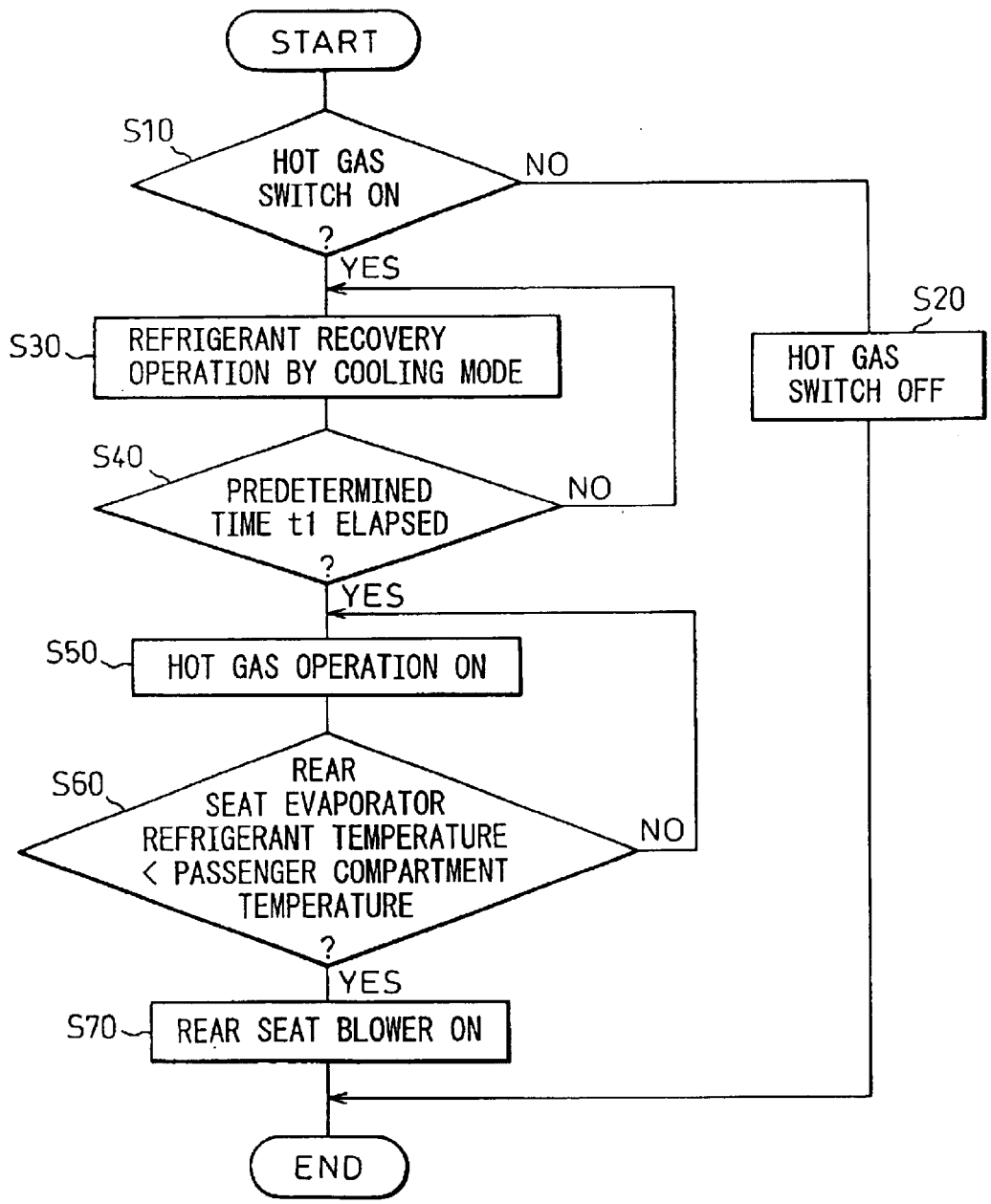
FIG. 4 is a flow chart of control at the time of the heating mode according to the first embodiment.

Therefore, control of this refrigerant recovery operation will be explained next. FIG. 4 shows the control routine performed by the ECU 60. First, at step S10, it is judged if the hot gas switch 71 is "ON". When the hot gas switch is "OFF", the routine proceeds to step S20, where the refrigeration cycle is set to the "OFF" state of the hot gas operation, that is, the heating solenoid valve 16 is closed and the cooling solenoid valve 15 is opened.

On the other hand, when the hot gas switch 71 is "ON", the routine proceeds to step S30, where the refrigerant recovery operation by the cooling mode is executed. That is, the refrigeration cycle is set to the cooling mode (state in which cooling use solenoid valve 15 is open and heating use solenoid valve 16 is closed), the solenoid clutch is turned "ON", and the compressor 10 is started up. Due to this, the refrigerant circulates in the refrigeration cycle due to the refrigerant circulation route at the time of the cooling mode, so it is possible to eject the dormant refrigerant accumulated in the condenser 20 by the delivered refrigerant of the compressor 10 and recover it at the front seat evaporator 32 side.

The refrigerant recovery operation by the cooling mode is continued for the predetermined time t1 (for example, about 15 seconds) judged at the next step S40. Note that at the time of the refrigerant recovery operation, it is not necessary to blow cooling air to the condenser 20, so the electric cooling fan of the condenser 20 is set to the off state. Further, it is not necessary to blow air to the front seat evaporator 32 and the rear seat evaporator 42 either, so in the present embodiment, due to reasons for control for setting the compressor 10 in the operating state, only the front seat blower 31 is set in the operating state. The rear seat blower 41 is set to the off state.

If the time of the refrigerant recovery operation reaches the predetermined time t1, the routine proceeds to step S50, where the refrigeration cycle is switched to the heating mode (state where cooling use solenoid valve 15 is closed and heating use solenoid valve 16 is open). Due to this, the high temperature delivery gas refrigerant of the compressor 10 is reduced in pressure at the heating pressure reducing device (fixed constriction) 17, then is directly introduced to the front seat evaporator 32, so the air blown to the front seat side in the passenger compartment can be heated by the front seat evaporator 32. That is, the heating mode by the hot gas heater can be executed.

At the next step S60, it is judged if the compartment temperature is higher than the refrigerant temperature of the rear seat evaporator 42. Here, the refrigerant temperature of the rear seat evaporator 42, specifically as explained above, is calculated based on the refrigerant pressure of the rear seat evaporator 42 detected by the second refrigerant pressure sensor 68. Further, the compartment temperature used may be the inside air temperature detected by the inside air temperature sensor 62.

If a long time elapses from previous operation of the refrigeration cycle, the refrigerant temperature of the rear seat evaporator 42 becomes the ambient air temperature, that is, a temperature the same as the inside air temperature. Therefore, right after the startup of the heating mode by the hot gas heater, usually the refrigerant temperature of the rear seat evaporator 42 becomes a temperature equal to the inside air temperature, so the judgment at step S60 becomes "NO", that is, the inside air temperature and the operation in the heating mode by the hot gas heater is continued.

Further, if the operation in the heating mode by the hot gas heater continues, the discharge of the high temperature air from the front seat air-conditioning unit 30 causes the inside air temperature to rise, whereby the inside air temperature becomes higher than the refrigerant temperature of the rear seat evaporator 42 by a predetermined amount. This being so, the judgment at step S60 becomes "YES", whereby the routine proceeds to step S70 where the rear seat blower 41 is operated. That is, at the same time the operation in the heating mode by the hot gas heater is continued, the rear seat blower 41 is operated.

Due to operation of the rear seat blower 41, the inside air is introduced into the rear seat air-conditioning unit 40 where heat exchange is performed between the inside air and the refrigerant of the rear seat evaporator 42. Due to this heat exchange, the refrigerant of the rear seat evaporator 42 absorbs heat from the inside air and rises in temperature, so the refrigerant pressure of the rear seat evaporator 42 rises by exactly an amount corresponding to this temperature rise.

Figure 5:
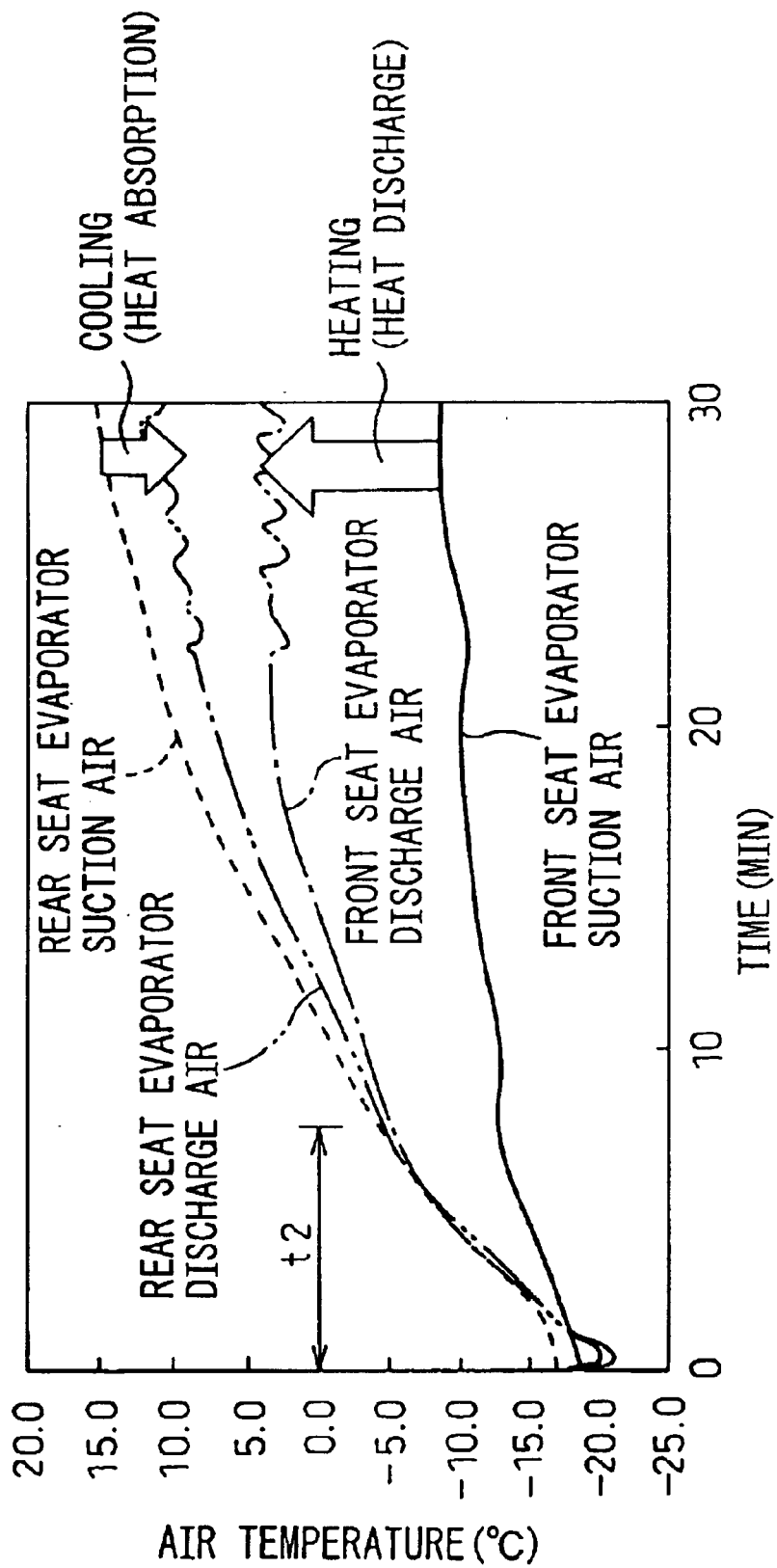
FIG. 5 is a view explaining the operation of the first embodiment.

Here, the temperature of the suction air (inside air temperature) of the rear seat evaporator sucked into the rear seat evaporator 42, as illustrated in FIG. 5, is much higher than the temperature of the suction air (temperature of low temperature outside air) of the front seat evaporator sucked into the front seat evaporator 32. Therefore, the refrigerant pressure of the rear seat evaporator 42 becomes higher than the refrigerant pressure of the front seat evaporator 32, so due to the differential pressure, the refrigerant accumulated in the rear seat evaporator 42 can be discharged through the check valve 46 to the low pressure gas-liquid separator 35 side. That is, during the operation in the heating mode by the hot gas heater, the differential pressure of the [refrigerant pressure of the rear seat evaporator 42]>[refrigerant pressure of front seat evaporator 32] is forcibly created and the dormant refrigerant in the rear seat evaporator 42 can be reliably recovered.

FIG. 5 shows the elapsed time after the startup of the heating mode by the hot gas heater on the abscissa and the air temperature around the front seat evaporator 32 and rear seat evaporator 42 on the ordinate. In FIG. 5, t2 is the time after startup of the heating mode by the hot gas heater to when the inside air temperature becomes higher than the refrigerant temperature of the rear seat evaporator 42. If it is judged that the inside air temperature becomes higher than the refrigerant temperature of the rear seat evaporator 42 and the rear seat blower 41 is operated, the refrigerant of the rear seat evaporator 42 absorbs heat from the inside air, so the temperature of the discharged air of the rear seat evaporator 42 falls from the temperature of the suction air (inside air) as shown in FIG. 5. As opposed to this, the temperature of the discharged air of the front seat evaporator 32 is heated by the heat discharged from the refrigerant, so rises from the temperature of the suction air (outside air).

Note that at FIG. 5, the temperature of the suction air (outside air) of the front seat evaporator 32 rises somewhat along with the elapse of time after startup of the heating mode since the temperature of the outside air introduction passage of the front seat air-conditioning unit 30 rises along with the rise in the temperature of the inside air and the outside air absorbs heat at the outside air introduction passage.

Note that at the point of time when the inside air temperature becomes higher than the refrigerant temperature of the rear seat evaporator 42, that is, at the point of time when the rear seat blower 41 is started up, the time elapsed after startup of the vehicle engine becomes shorter and the hot water temperature does not sufficiently rise, so when operating the rear seat blower 41 at step S70, it is preferable to set the operating voltage of the motor 41a for driving the rear seat blower 41 at the minimum voltage and operate the drive motor 41a at its minimum speed.

Due to this, it is possible to operate the rear seat blower 41 by the minimum volume, so it is possible to avoid the low temperature air not sufficiently raised in temperature being blown in a large amount to the rear seat side of the passenger compartment and possible to prevent deterioration of the heating feeling accompanying operation of the rear seat blower 41.

Second Embodiment

In the first embodiment, at step S60 of FIG. 4, it was judged if the inside air temperature was higher than the refrigerant temperature of the rear seat evaporator 42. In the second embodiment, as shown in FIG. 6, at step S60, it is judged if at least the predetermined time t2 has elapsed after startup of the heating mode by the hot gas heater.

That is, as shown in FIG. 5, when at least the predetermined time t2 has elapsed after startup of the heating mode, the temperature of the suction air (inside air) of the rear seat evaporator 42 becomes higher than the refrigerant temperature of the rear seat evaporator 42 and the refrigerant of the rear seat evaporator 42 can absorb heat from the suction air (inside air). Therefore, as shown in FIG. 6, at step S60, it is judged if at least the predetermined time t2 has elapsed from the startup of the heating mode. If at least the predetermined time t2 has elapsed, the routine proceeds to step S70, whereby it is sufficient to operate the rear seat blower 41. According to the second embodiment, the sensor 68 for detecting the refrigerant temperature of the rear seat evaporator 42 can be eliminated.

Third Embodiment

Figure 6:
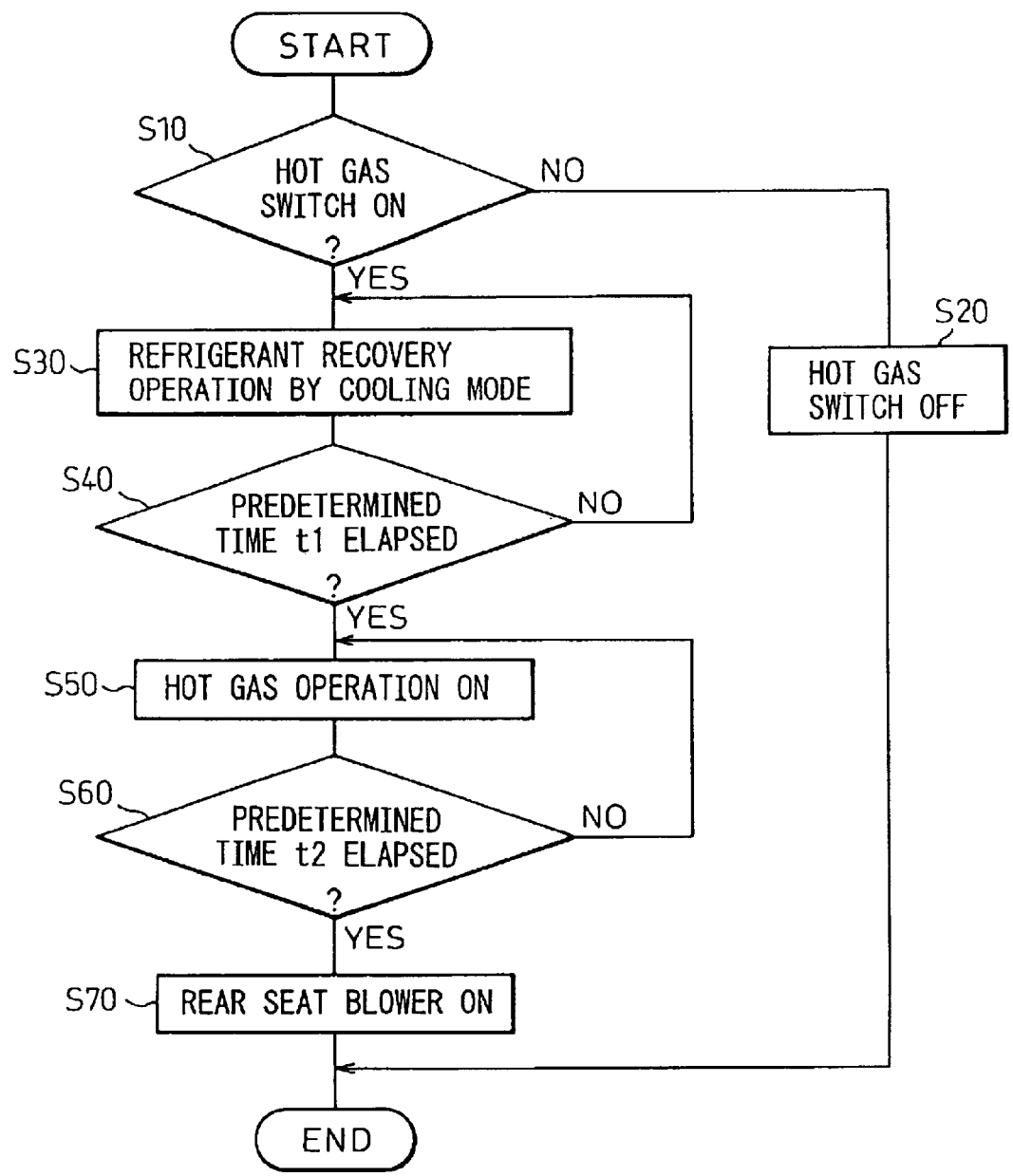
FIG. 6 is a flow chart of control at the time of the heating mode according to a second embodiment.
Figure 7:
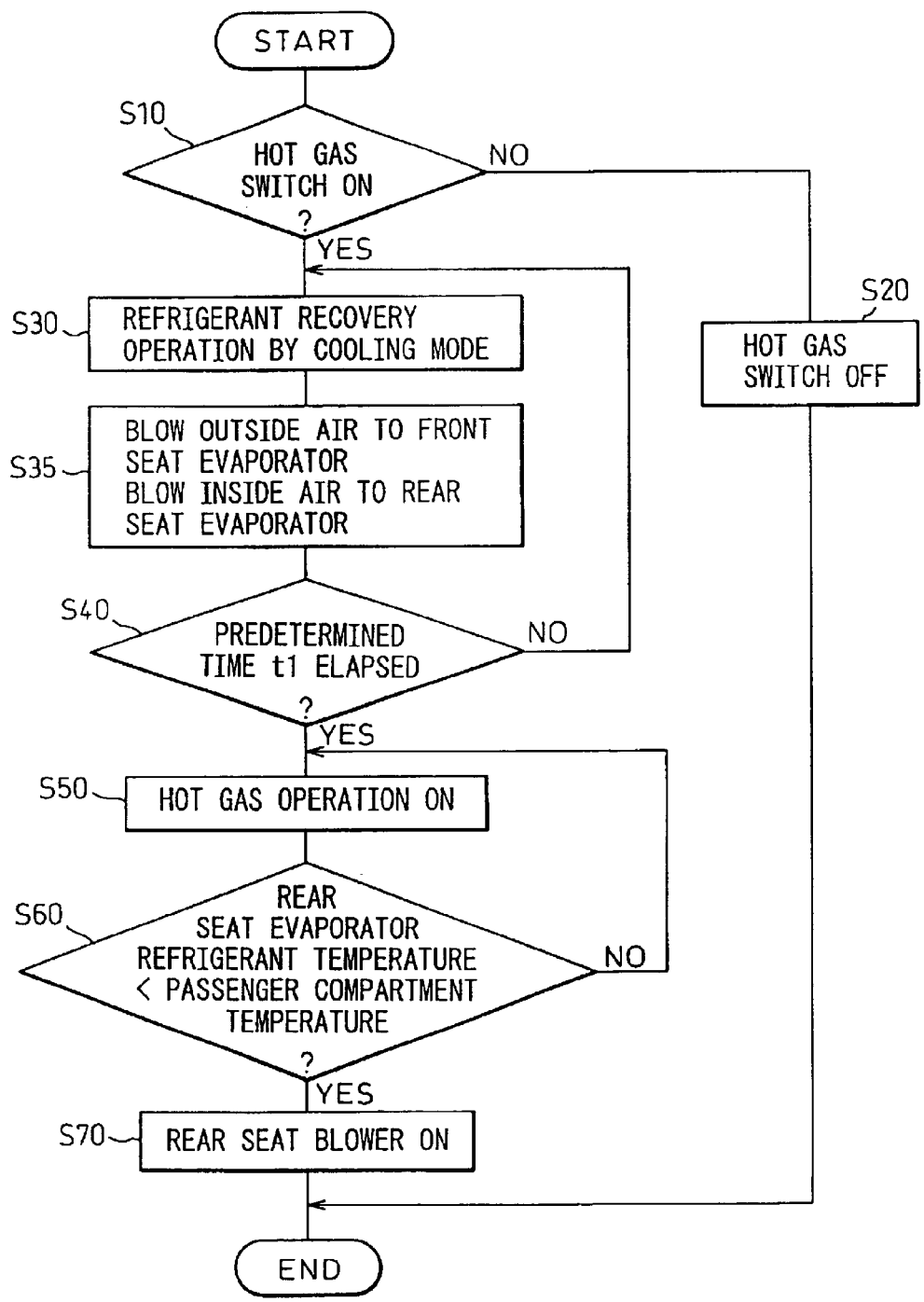
FIG. 7 is a flow chart of control at the time of the heating mode according to a third embodiment.

In the first and second embodiments, the explanation was given of the example of operating the front seat blower 31 of the front seat air-conditioning unit 30 and setting the rear seat blower 41 of the rear seat air-conditioning unit 40 to the off state in the refrigerant recovery operation by the cooling mode at steps S30 of FIG. 4 and FIG. 6. In the third embodiment, as shown in FIG. 7, the refrigeration cycle is set to the state of the refrigerant recovery operation due to the cooling mode (state with cooling use solenoid valve 15 on and heating use solenoid valve 16 off) at step S30 as shown in FIG. 7, then the routine proceeds to step S35, where the front seat blower 31 is operated to blow outside air to the front seat evaporator 32. On the other hand, at the rear seat air-conditioning unit 40, the rear seat blower 41 is operated to blow inside air to the rear seat evaporator 42.

Due to this, a differential pressure of the [refrigerant pressure of rear seat evaporator 42]>[refrigerant pressure of front seat evaporator 32] is generated based on the differential temperature of the [inside air temperature]>[outside air temperature], so the refrigerant accumulated at the rear seat evaporator 42 can be recovered at the low pressure gas-liquid separator 35 side.

That is, according to the third embodiment, at the time of the refrigerant recovery operation by the cooling mode, it is possible to recover not only the dormant refrigerant at the condenser 20 side, but also the dormant refrigerant in the rear seat evaporator 42 at the low pressure gas-liquid separator 35 side.

Further, in the third embodiment as well, by operating the rear seat blower 41 at step S70 at the time of the heating mode by the hot gas heater cycle, it is possible to recover the dormant refrigerant in the rear seat evaporator 42 at the low pressure gas-liquid separator 35.

At step S35, when operating the front seat blower 31 and the rear seat blower 41, it is preferable to make the operating voltages of the motors 31a and 41a for driving the two blowers 31 and 41 the minimum voltages and operate the two blowers 31 and 41 by the minimum volumes. By making the blowing volumes of the two blowers 31 and 41 the minimum volumes in this way, it is possible to keep deterioration of the heating feeling due to blowing of low temperature air to a minimum so this is preferable in practice.

Note that in the third embodiment as well, similar effects can of course be exhibited even if replacing the judgment of the actual refrigerant temperature for the judgment of step S60 with judgment of the elapsed time such as with step S60 of the second embodiment (FIG. 6).

Fourth Embodiment

Figure 8:
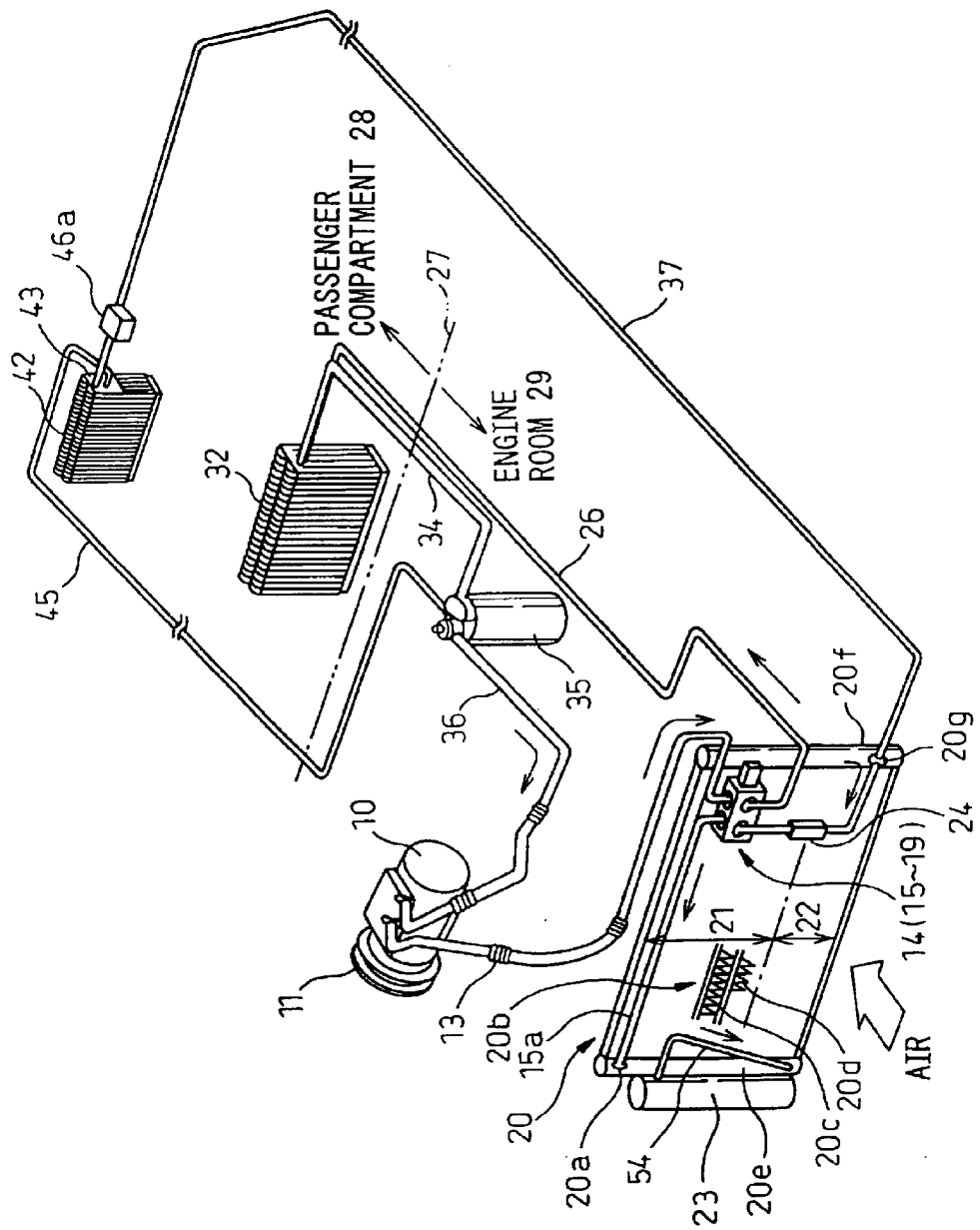
FIG. 8 is a view of the mounting of the refrigeration cycle parts in a vehicle according to a fourth embodiment.

In the first embodiment, as shown in FIG. 1 and FIG. 2, a check valve 46 was arranged near the downstream end of the outlet side low pressure pipe 45 of the rear seat evaporator 42 and this was used to prevent the refrigerant from flowing from the low pressure gas-liquid separator 35 to the rear seat evaporator 42 and the refrigerant accumulating in the rear seat evaporator 42 at the time of the heating mode by the hot gas heater cycle. In the fourth embodiment, as shown in FIG. 8, the check valve 46 is not arranged at the outlet side of the rear seat evaporator 42. Instead, the check valve 46a is arranged in the upstream side passage of the temperature-type expansion valve 43 serving as a rear seat pressure reducing device, that is, at a position near the downstream end of the rear seat pressure reducing device 37 of the refrigeration cycle.

However, at the time of the heating mode by the hot gas heater cycle, the hot gas bypass passage 18 bypasses the condenser 20 and the rear seat evaporator 42 and introduces the delivery refrigerant of the compressor to the front seat evaporator 32. At the time of this heating mode, however, in the same way as the first to third embodiments, by operating the rear seat blower 41 to raise the refrigerant pressure of the rear seat evaporator 42 higher than the refrigerant pressure of the front seat evaporator 32, even if the check valve 46 is not arranged at the outlet side of the rear seat evaporator 42, it is possible to prevent the refrigerant from flowing from the outlet side of the front seat evaporator 32 to the rear seat evaporator 42.

However, the condenser 20 is arranged in the outside air atmosphere such as the inside of the engine compartment, so at the time of heating in the winter, the condenser 20 is exposed to a low temperature outside air atmosphere. Therefore, the refrigerant pressure in the condenser 20 becomes the saturated pressure determined by the outside air temperature, that is, a pressure much lower than the refrigerant pressure of the rear seat evaporator 42. Due to this, the refrigerant tries to flow from the rear seat evaporator 42 to the condenser 20 side.

Therefore, in the fourth embodiment, the check valve 46 is arranged at a position near the downstream end in the rear seat high pressure pipe 37, that is, a location right in front of the temperature type expansion valve 42 serving as the rear seat pressure reducing device. Due to this, at the time of the heating mode, the refrigerant is prevented from flowing from the rear seat evaporator 42 to the rear seat high pressure pipe 37 and further to the condenser 20 side by the check valve 46a.

In this way, according to the fourth embodiment, the check valve 46a is arranged at the high pressure pipe 37 of the refrigeration cycle at the upstream side of the temperature type expansion valve 43, so the check valve 46a can be reduced in size. That is, the high pressure pipe 37 of the refrigeration cycle carries the flow of the high pressure liquid refrigerant with a small specific volume (large density), so the pipe diameter can be sufficiently reduced compared with the low pressure pipe 45. Accordingly, the check valve 46a can be greatly reduced in size compared with the case of arranging it at the low pressure pipe 45 as in FIG. 1 and FIG. 2.

Other Embodiments

Note that in the above embodiments, the front seat pressure reducing device 24 was comprised of only a fixed constriction, but it is also possible to combine a variable constriction changing in constriction opening in accordance with the state of the high pressure refrigerant (pressure, temperature, etc.) at the outlet part (upstream side of pressure reducing device) of the condenser 20 with a fixed constriction and use this combination of a variable constriction and fixed constriction to form the front seat pressure reducing device 24.

Further, in the above embodiments, the rear seat pressure reducing means was comprised of a temperature-type expansion valve 43, but it is also possible to form this rear seat pressure reducing means by an electrical type expansion valve etc.

While the invention has been described with reference to specific embodiments chosen for purpose of illustration, it should be apparent that numerous modifications could be made thereto by those skilled in the art without departing from the basic concept and scope of the invention.

What is claimed is:

1. A vehicle air-conditioning system of a dual air-conditioner type
provided with a front seat air-conditioning unit for air-conditioning a front seat area in a passenger compartment and a rear seat air-conditioning unit for air-conditioning a rear seat area in the passenger compartment;
said front seat air-conditioning unit has arranged in it an inside/outside air switching function unit for switching between introduction of inside air and outside air, a front seat blower for blowing air introduced by said inside/outside air switching function unit toward the front seat area in the passenger compartment, and a front seat evaporator for absorbing heat from the air blown by said front seat blower for evaporation of low pressure refrigerant of a refrigeration cycle;
said rear seat air-conditioning unit has arranged in it a rear seat blower for sucking in inside air and blowing it toward the rear seat area in the passenger compartment and a rear seat evaporator for absorbing heat from the air blown by said rear seat blower for evaporation of low pressure refrigerant of said refrigeration cycle;
said refrigeration cycle is provided with a hot gas bypass passage for reducing the pressure of the gas refrigerant delivered from the compressor, then introducing it into said front seat evaporator;
at the time of the cooling mode, said hot gas bypass passage is set to a closed state, the refrigerant passage at a radiator side of said refrigeration cycle is set to an open state, the gas refrigerant delivered from said compressor is introduced to said radiator, said refrigerant passed through said radiator is reduced in pressure by the front seat pressure reducing function unit and rear seat pressure reducing function unit, the low pressure refrigerant passed through said front seat pressure reducing function unit is made to evaporate by said front side evaporator, and the low pressure refrigerant passed through said rear seat pressure reducing function unit is made to evaporate by said rear seat evaporator;
at the time of the heating mode, said hot gas bypass passage is set to an open state, the refrigerant passage at said radiator side is closed, and the gas refrigerant delivered from said compressor is directly introduced to said front side evaporator by said hot gas bypass passage to exhibit a hot gas heater function by said front seat evaporator;
at said heating mode, said inside/outside air switching function unit is used to set an outside air mode, said front seat blower is used to blow outside air to said front seat evaporator, and, when judging conditions by which the refrigerant of said rear seat evaporator can absorb heat from the inside air at said heating mode exist, said rear seat blower is operated to blow inside air to said rear seat evaporator.

2. A vehicle air-conditioning system as set forth in claim 1, wherein
at the time of startup of said heating mode, said refrigeration cycle is set to said cooling mode, a refrigerant recovery operation is performed, and said refrigeration cycle is switched to said heating mode after said refrigerant recovery operation is performed.

3. A vehicle air-conditioning system as set forth in claim 1, wherein at said heating mode, said rear seat blower is made to operate at its minimum volume mode.

4. A vehicle air-conditioning system as set forth in claim 2, wherein at said heating mode, said rear seat blower is made to operate at its minimum volume mode.

5. A vehicle air-conditioning system as set forth in claim 1, wherein
said system is further provided with an inside air temperature detecting function unit for detecting an inside air temperature and a refrigerant temperature information detecting function unit for detecting information relating to the refrigerant temperature of said rear seat evaporator and
the conditions by which the refrigerant of said rear seat evaporator can absorb heat from the inside air are judged to exist based on said inside air temperature and said refrigerant temperature.

6. A vehicle air-conditioning system as set forth in claim 2, wherein
said system is further provided with an inside air temperature detecting function unit for detecting an inside air temperature and a refrigerant temperature information detecting function unit for detecting information relating to the refrigerant temperature of said rear seat evaporator and
the conditions by which the refrigerant of said rear seat evaporator can absorb heat from the inside air are judged to exist based on said inside air temperature and said refrigerant temperature.

7. A vehicle air-conditioning system as set forth in claim 5, wherein said refrigerant temperature information detecting function unit is comprised of a refrigerant pressure detecting function unit for detecting a refrigerant pressure of said rear seat evaporator.

8. A vehicle air-conditioning system as set forth in claim 6, wherein said refrigerant temperature information detecting function unit is comprised of a refrigerant pressure detecting function unit for detecting a refrigerant pressure of said rear seat evaporator.

9. A vehicle air-conditioning system as set forth in claim 1, wherein the conditions by which the refrigerant of said rear seat evaporator can absorb heat from the inside air are judged to exist based on the elapsed time after startup of said heating mode.

10. A vehicle air-conditioning system as set forth in claim 2, wherein the conditions by which the refrigerant of said rear seat evaporator can absorb heat from the inside air are judged to exist based on the elapsed time after startup of said heating mode.

11. A vehicle air-conditioning system as set forth in claim 1, wherein, when performing said refrigerant recovery operation, said inside/outside air switching function unit sets the outside air mode to blow outside air from said front seat blower to said front seat evaporator and said rear seat blower is operated to blow inside air to said rear seat evaporator.

12. A vehicle air-conditioning system as set forth in claim 2, wherein, when performing said refrigerant recovery operation, said inside/outside air switching function unit sets the outside air mode to blow outside air from said front seat blower to said front seat evaporator and said rear seat blower is operated to blow inside air to said rear seat evaporator.

13. A vehicle air-conditioning system as set forth in claim 1, wherein a rear seat high pressure pipe connected to the upstream side of the rear seat pressure reducing function unit arranged at an inlet of said rear seat evaporator has arranged in it a check valve for preventing the inflow of refrigerant from said rear seat evaporator to said radiator side.

14. A vehicle air-conditioning system as set forth in claim 2, wherein a rear seat high pressure pipe connected to the upstream side of the rear seat pressure reducing function unit arranged at an inlet of said rear seat evaporator has arranged in it a check valve for preventing the inflow of refrigerant from said rear seat evaporator to said radiator side.

* * * * *